US012593285B2

(12) United States Patent
Zhang et al.

(10) Patent No.: US 12,593,285 B2
(45) Date of Patent: Mar. 31, 2026

(54) METHODS AND APPARATUS TO ADJUST TRANSMIT POWER HEADROOM FOR A SECONDARY LINK WHILE OPERATING IN A NON-STANDALONE MODE

(71) Applicant: QUALCOMM Incorporated, San Diego, CA (US)

(72) Inventors: Jianfu Zhang, Shanghai (CN); Bing Leng, Shanghai (CN); Xiaomeng Lu, Shanghai (CN); Jian Li, Shanghai (CN); Hao Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/266,204

(22) PCT Filed: Mar. 4, 2021

(86) PCT No.: PCT/CN2021/079014
§ 371 (c)(1),
(2) Date: Jun. 8, 2023

(87) PCT Pub. No.: WO2022/183421
PCT Pub. Date: Sep. 9, 2022

(65) Prior Publication Data
US 2024/0056981 A1     Feb. 15, 2024

(51) Int. Cl.
*H04W 52/14* (2009.01)
*H04W 52/36* (2009.01)
*H04W 76/15* (2018.01)

(52) U.S. Cl.
CPC ....... *H04W 52/146* (2013.01); *H04W 52/367* (2013.01); *H04W 76/15* (2018.02)

(58) Field of Classification Search
CPC . H04W 52/146; H04W 76/15; H04W 52/367; H04W 52/36
See application file for complete search history.

(56) References Cited

U.S. PATENT DOCUMENTS

2015/0282104 A1* 10/2015 Damnjanovic ..... H04W 52/365
                                                    455/522
2017/0318504 A1* 11/2017 Zhang ............... H04W 36/0027
2020/0137819 A1* 4/2020 Shi ...................... H04W 52/367

OTHER PUBLICATIONS

CATT: "UL Power Control for NR DC", 3GPP TSG RAN WG1 Meeting #98bis, 3GPP Draft, R1-1910324 NRDC Power Control, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), pp. 1-5, XP051808505, Figure 3, The whole document.

(Continued)

*Primary Examiner* — John J Lee
(74) *Attorney, Agent, or Firm* — Procopio, Cory, Hargreaves & Savitch

(57) ABSTRACT

Apparatus, methods, and computer-readable media for adjusting transmit power headroom for a secondary link while operating in an NSA mode are disclosed herein. An example method for wireless communication at a UE includes receiving a request to enter a multi-connectivity mode in which the UE is able to transmit data to a first base station via a first access link or to a second base station via a second access link. The example method also includes determining a first maximum uplink transmit power for transmissions using the first access link. Additionally, the example method includes determining a second maximum uplink transmit power for transmissions using the first access link based on uplink transmissions transmitted during an evaluation window. The example method also includes transmitting, via the first access link, at least one uplink transmission based on the second maximum uplink transmit power.

27 Claims, 11 Drawing Sheets

(56) References Cited

OTHER PUBLICATIONS

International Search Report and Written Opinion—PCT/CN2021/079014—ISA/EPO—Aug. 16, 2021.
Qualcomm Incorporated: "Summary for Uplink Power Control for Supporting NR-NR Dual Connectivity", 3GPP TSG-RAN WG1 Meeting AH-1901, 3GPP Draft, R1-1901452, 3rd Generation Partnership Project (3GPP), Mobile Competence Centre, 650, Route Des Lucioles, F-06921 Sophia-Antipolis Cedex, France, Jan. 25, 2019 (Jan. 25, 2019), pp. 1-11, XP051601365, p. 3-p. 6.

* cited by examiner

Base Station
402

UE
404

410

Msg1 420

Msg2 430

Msg3 440

Msg4 450

400

700

```
//Var definition

MTPL: the actual max tx power based on RF capability, which is shared by LTE and NR
    in NSA split bearer scenario.
    MTPL_LTE: the max tx power can be used by LTE leg in NAS split ul bearer scenario
    Tevl: the configurable time span to evaluate and set LTE leg's MTPL. By default 10
    SysFrames
    UL_BW_LTE: total UL bandwidth of LTE leg
    NR_firstActiveUplinkBWP: first Active UL BWP of NR leg
    Thresh1: the configurable threshold of LTE tx power to enter the algorithm. By default
    20dBm
    Margin1: the configurable tuning step for LTE tx pwr, by default 3dBm
    Margin2: the configurable tuning step for LTE tx pwr, by default 2dBm, and Margin2
    must satisfied condition: Margin2 <= Margin1
```
710

```
//Algorithm start

If rcv (ul-DataSplitThreshold and firstActiveUplinkBWP) in "NR5G RRC OTA msg
    RADIO_BEARER_CONFIG" and ul-DataSplitThreshold != infinity
```
720

```
//Initialization of MTPL_LTE if Tx power of LTE's msg3 > Thresh1
            MTPL_LTE = MTPL
    else
            MTPL_LTE = MTPL * (UL_BW_LTE/ UL_BW_LTE + NR_firstActiveUplinkBWP)
```
730

```
//evalute LTE_UL_BLER and Ave_Sig_Level every Tevl to adjust MTPL_LTE accordingly
    start Tevl
    <...>                                                          } 742
    on expiry of Tevl:
            LTE_UL_BLER = PHICH NACK/(PHICH ACK + NACK) during Tevl  }
            Avg_Sig_Levl = Avg SNR during Tevl                       } 744
            if (LTE_UL_BLER > 10%) or (Avg_Sig_Levl < 10)
                    MTPL_LTE = MTPL
            elseif (5% < LTE_UL_BLER < 10%)
                    MTPL_LTE += Margin1                              } 746
            else
                    MTPL_LTE -= Margin2
```
740

FIG. 7

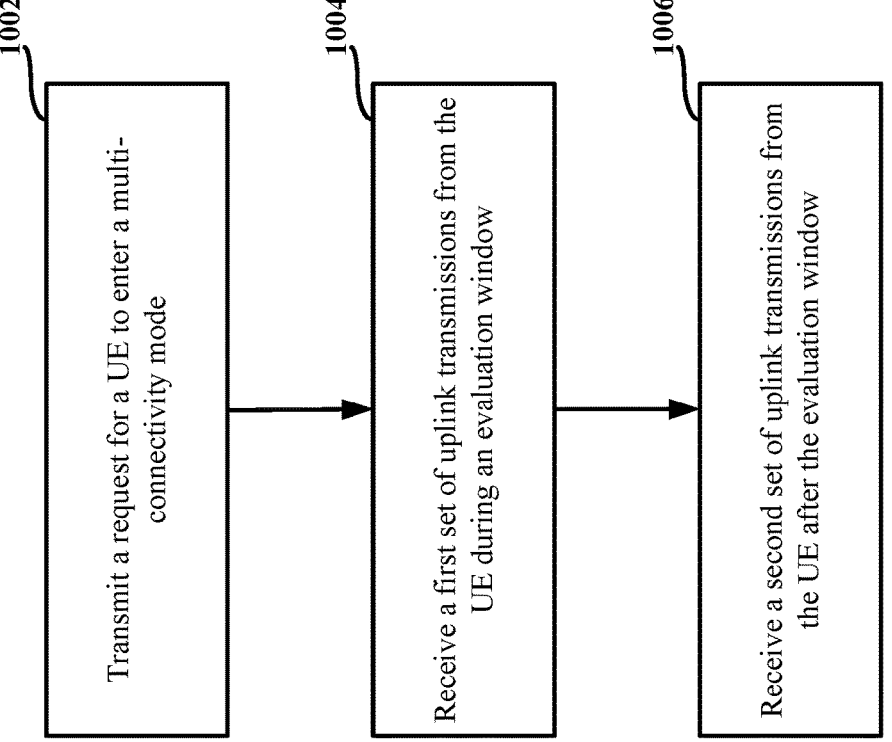
1002
Transmit a request for a UE to enter a multi-connectivity mode
1004
Receive a first set of uplink transmissions from the UE during an evaluation window
1006
Receive a second set of uplink transmissions from the UE after the evaluation window
1000
FIG. 10

Base Station 1160

UE 104

1102

Cellular RF Transceiver 1122

Reception Component 1130

First Set Reception Component 1142

Multi-Connectivity Component 1140

Second Set Reception Component 1144

Communication Manager 1132

Transmission Component 1134

Baseband Unit 1104

1100

METHODS AND APPARATUS TO ADJUST TRANSMIT POWER HEADROOM FOR A SECONDARY LINK WHILE OPERATING IN A NON-STANDALONE MODE

CROSS REFERENCE TO RELATED APPLICATION(S)

This application is a National Stage Application filed under 35 U.S.C. § 371 of PCT International Application No. PCT/CN2021/079014, entitled "METHODS AND APPA-RATUS TO ADJUST TRANSMIT POWER HEADROOM FOR A SECONDARY LINK WHILE OPERATING IN A NON-STANDALONE MODE" and filed Mar. 4, 2021, which is expressly incorporated by reference herein in its entirety.

BACKGROUND

Technical Field

The present disclosure relates generally to communica-tion systems, and more particularly, to non-standalone mode.

Introduction

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division mul-tiple access (FDMA) systems, orthogonal frequency divi-sion multiple access (OFDMA) systems, single-carrier fre-quency division multiple access (SC-FDMA) systems, and time division synchronous code division multiple access (TD-SCDMA) systems.

These multiple access technologies have been adopted in various telecommunication standards to provide a common protocol that enables different wireless devices to commu-nicate on a municipal, national, regional, and even global level. An example telecommunication standard is 5G New Radio (NR). 5G NR is part of a continuous mobile broad-band evolution promulgated by Third Generation Partner-ship Project (3GPP) to meet new requirements associated with latency, reliability, security, scalability (e.g., with Inter-net of Things (IoT)), and other requirements. 5G NR includes services associated with enhanced mobile broad-band (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). An example apparatus receives a request to enter a multi-connectivity mode in which the UE is able to transmit data to a first base station via a first access link or to a second base station via a second access link. The example apparatus also deter-mines, based on the request, a first maximum uplink transmit power for transmissions using the first access link. Addi-tionally, the example apparatus determines a second maxi-mum uplink transmit power for transmissions using the first access link based on uplink transmissions transmitted during an evaluation window. The example apparatus also trans-mits, to the first base station via the first access link, at least one uplink transmission based on the second maximum uplink transmit power.

In another aspect of the disclosure, a method, a computer-readable medium, and an apparatus are provided for wireless communication of a base station. An example apparatus transmits, to a UE, a request for the UE to enter a multi-connectivity mode in which the UE is able to transmit data to the first base station via a first access link or to a second base station via a second access link. The example apparatus also receives a first set of uplink transmissions from the UE during an evaluation window. The first set of uplink trans-missions may be associated with a first maximum uplink transmit power associated with the first access link. Addi-tionally, the example apparatus receives a second set of uplink transmissions from the UE. The second set of uplink transmissions may be associated with a second maximum uplink transmit power associated with the first access link. The second set of uplink transmissions may be received after the evaluation window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 depicts a listing of pseudocode for adjusting transmit power headroom for a secondary link while operating in a non-standalone mode, in accordance with the teachings disclosed herein.

FIG. 10 is a flowchart of a method of wireless communication at a base station, in accordance with the teachings disclosed herein.

DETAILED DESCRIPTION

Figure 1:
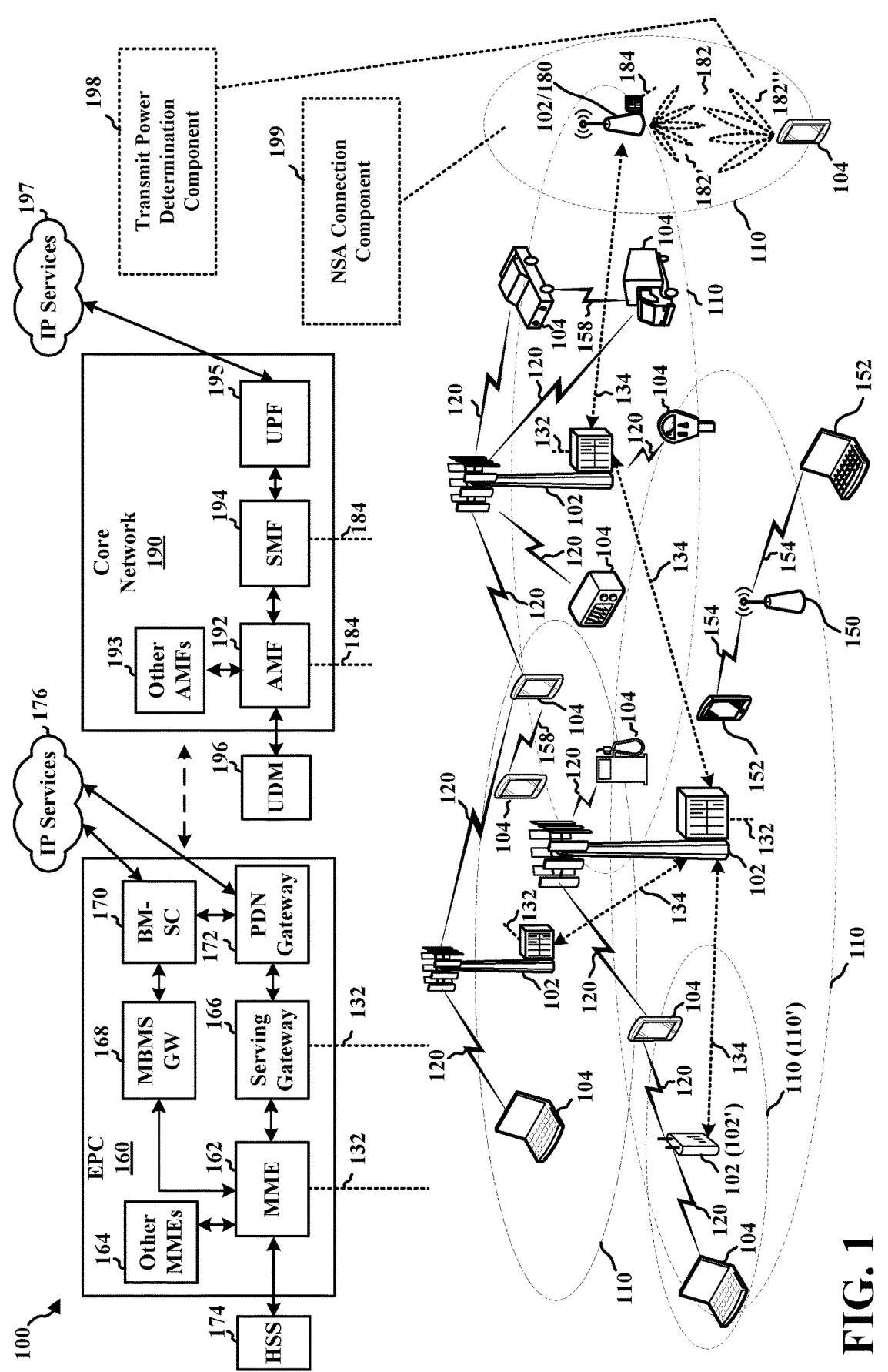
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some examples, a wireless device (e.g., a UE) may be connected to more than one network entity at a time. For example, a UE may communicate with a communication network using a multi-connectivity configuration, such as dual-connectivity. A UE configured for dual-connectivity may be connected to two different base stations, such as a master base station and a secondary base station. The master base station may facilitate communication via a first access network and a group of cells serving the master base station may be referred to as a master cell group (MCG). The secondary base station may facilitate communication via a second access network and a group of cells serving the secondary base station may be referred to as a secondary cell group (SCG).

In some examples, the secondary base station supporting the SCG may not have a control plane connection to a core network and, instead, may rely on the master base station. Such a scenario may be referred to as "non-standalone" (NSA) mode. In the NSA mode, the master base station provides control plane connection to the core network. The UE can send and receive control data and user data with the first access network, but may be limited to sending and receiving user data through the second access network.

In some examples, to achieve high data throughput associated with the second access network, it may be beneficial to provide additional power headroom for uplink transmissions though the second access network. Example techniques disclosed herein facilitate power headroom sharing for uplink transmissions for a UE that is connected to at least two cell groups (e.g., an MCG and an SCG) and is operating in a non-standalone mode. For example, aspects disclosed herein attempt to reduce the transit power associated with the master access link to grant (or provide) the secondary access link more power headroom. By granting the secondary access link more power headroom, more data may be carried on the second access link, which may then facilitate achieving higher uplink throughput.

FIG. 1 is a diagram illustrating an example of a wireless communications system and an access network 100. The wireless communications system (also referred to as a wireless wide area network (WWAN)) includes base stations

102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In some examples, a wireless communication device, such as a UE 104, may be configured to manage one or more aspects of wireless communication by adjusting a transmit power headroom for a secondary link while operating in a non-standalone mode. As an example, in FIG. 1, the UE 104 may include a transmit power determination component 198 configured to receive a request to enter a multi-connectivity mode in which the UE is able to transmit data to a first base station via a first access link or to a second base station via a second access link. The example transmit power determination component 198 may also be configured to determine, based on the request, a first maximum uplink transmit power for transmissions using the first access link. Additionally, the example transmit power determination component 198 may be configured to determine a second maximum uplink transmit power for transmissions using the first access link based on uplink transmissions transmitted during an evaluation window. The example transmit power determination component 198 may also be configured to transmit, to the first base station via the first access link, at least one uplink transmission based on the second maximum uplink transmit power.

Still referring to FIG. 1, a wireless communication device, such as a base station 102/180, may be configured to manage one or more aspects of wireless communication by requesting a UE to enter a multi-connectivity mode. As an example, in FIG. 1, the base station 102/180 may include a NSA connection component 199 configured to transmit, to a UE, a request for the UE to enter a multi-connectivity mode in which the UE is able to transmit data to the first base station via a first access link or to a second base station via a second access link. The example NSA connection component 199 may also be configured to receive a first set of uplink transmissions from the UE during an evaluation window. The first set of uplink transmissions may be associated with a first maximum uplink transmit power associated with the first access link. Additionally, the example NSA connection component 199 may be configured to receive a second set of uplink transmissions from the UE. The second set of uplink transmissions may be associated with a second maximum uplink transmit power associated with the first access link. The second set of uplink transmissions may be received after the evaluation window.

Although the following description provides examples directed to 5G NR (and, in particular, to an NSA mode), the concepts described herein may be applicable to other similar areas, such as LTE, LTE-A, CDMA, GSM, and/or other wireless technologies, in which a UE may enter a multi-connectivity mode in which a transmit power associated with uplink transmissions may be adjusted to improve uplink throughput.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway

168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality-of-Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
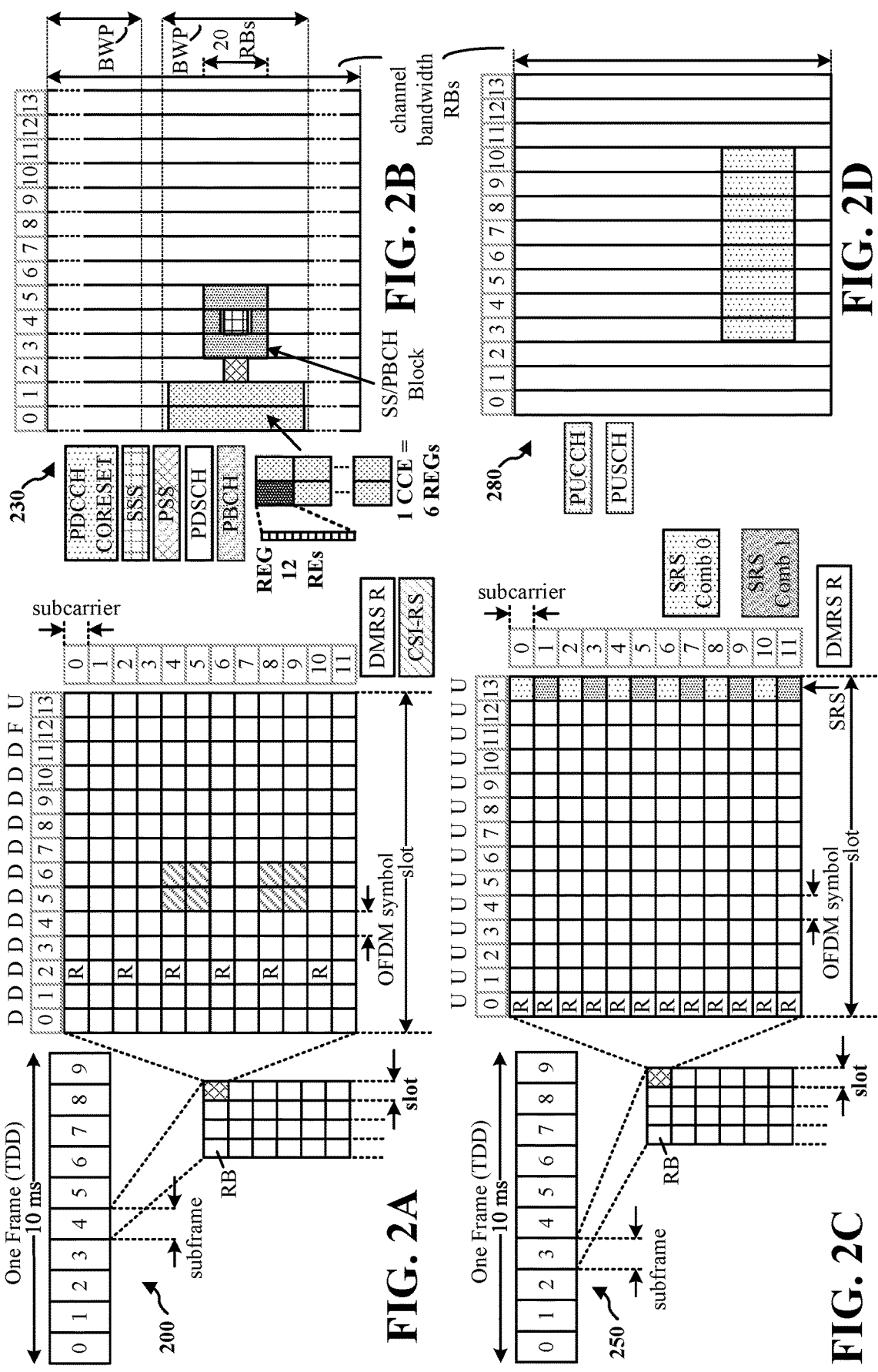
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
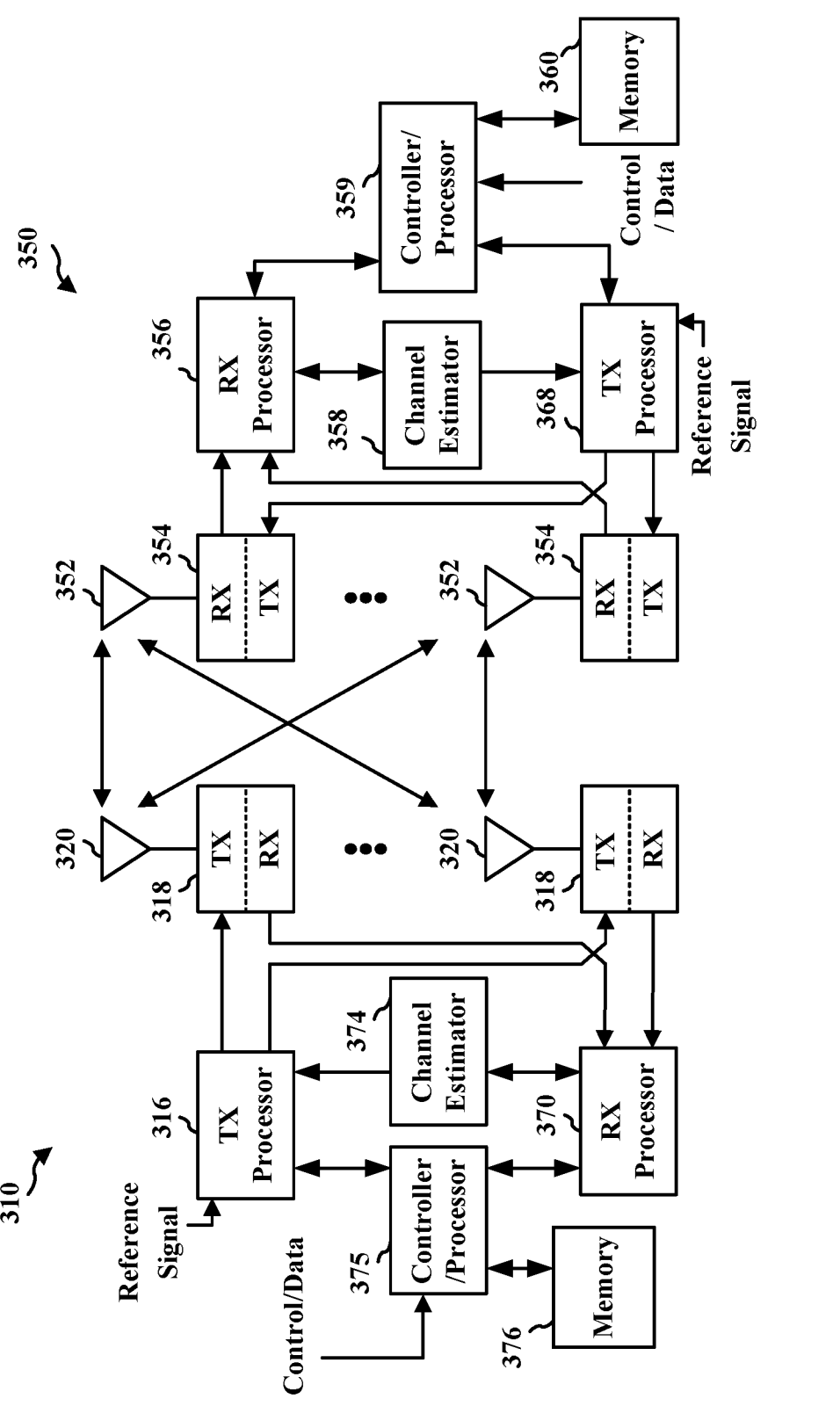
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the transmit power determination component 198 of FIG. 1.

At least one of the TX processor 316, the RX processor 370, and the controller/processor 375 may be configured to perform aspects in connection with the NSA connection component 199 of FIG. 1.

In order for a UE and a base station (e.g., a master base station or a secondary base station) to communicate, the base station and the UE may acquire a timing advance (TA) for uplink signals. The base station and the UE may acquire a timing synchronization (e.g., uplink timing synchronization) through a random access procedure. For example, the UE may initiate the random access procedure for initiate access to a cell provided by the base station. In some examples, the UE may initiate the random access procedure to facilitate an RRC connection reestablishment. In some examples, the UE may initiate the random access procedure to perform a handover from a serving base station to a target base station. In some examples, the UE may initiate the random access procedure to facilitate reacquisition of a timing synchronization. In some examples, the UE may initiate the random access procedure to transition from an RRC inactive state. In some examples, the UE may initiate the random access procedure to perform SCell timing alignment. In some examples, the UE may initiate the random access procedure to request system information (SI). In some examples, the UE may initiate the random access procedure to facilitate beam failure recovery.

Figure 4:
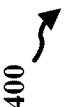
FIG. 4 is a diagram illustrating a call flow diagram between a UE and a base station implementing a four-step random access channel (RACH) procedure, in accordance with various aspects of the present disclosure.

In certain aspects, the random access procedure may be a four-step random access channel (RACH) procedure in which the UE and the base station exchange four messages. FIG. 4 is a diagram 400 illustrating a call flow diagram between a base station 402 and a UE 404 implementing a four-step random access channel (RACH) procedure 410, as presented herein. Aspects of the UE 404 may be implemented by the UE 104 of FIG. 1 and/or the UE 350 of FIG. 3. Aspects of the base station 402 may be implemented by the base station 102/180 of FIG. 1 and/or the base station 310 of FIG. 3.

In the illustrated example of FIG. 4, the four-step RACH procedure 410 includes the exchange of four messages. Specifically, the UE 404 may initiate the message exchange of the four-step RACH procedure 410 by transmitting a first RACH message 420 ("Msg1") to the base station 402. The first RACH message 420 may include a preamble. In certain aspects, the first RACH message 420 may not include a payload (e.g., without a payload).

The base station 402 then sends, to the UE 404, a second RACH message 430 ("Msg2") including a random access response (RAR). In certain aspects, the second RACH message 430 may include an identifier of the RACH preamble, a timing advance (TA), an uplink grant for the UE 404 to transmit data, a cell radio network temporary identifier (C-RNTI), and/or a back-off indicator.

The UE 404 then sends a third RACH message 440 ("Msg3") to the base station 402. In certain aspects, the third RACH message 440 may include a radio resource control (RRC) connection request, an RRC connection re-establishment request, or an RRC connection resume request. The type of request included in the third RACH message 440 may depend on a type of trigger causing the UE 404 to initiate the random access procedure.

The base station 402 then completes the four-step RACH procedure 410 by sending a fourth RACH message 450 to the UE 404. In certain aspects, the fourth RACH message 450 may include timing advancement information, contention resolution information, and/or RRC connection setup information.

Although not shown in FIG. 4, in some examples, the UE 404 may re-transmit a RACH message. For example, in certain aspects, after transmitting the first RACH message 420, the UE 404 may re-transmit (e.g., periodically, a-periodically, and/or as a one-time event) the first RACH message 420. In some examples, the UE 404 may continue retransmitting the first RACH message 420 until the UE 404 receives the second RACH message 430 from the base station 402. In some examples, the UE 404 may continue retransmitting the first RACH message 420 until a timer (e.g., a RACH procedure timer) expires.

In some examples, a RACH message received by the UE 404 (e.g., the second RACH message 430 and/or the fourth RACH message 450) may indicate that the base station 402 did not successfully process (e.g., receive and/or decode) at least a portion of a RACH message transmitting by the UE 404. In such examples, the UE 404 may re-transmit the RACH message indicated by the received RACH message. For example, the fourth RACH message 450 may indicate to the UE 404 that the base station 402 did not successfully process (e.g., receive and/or decode) the third RACH message 440 from the UE 404. In such examples, the UE 404 may re-transmit the third RACH message 440. In some examples, the UE 404 may continue retransmitting the third RACH message 440 until the UE 404 receives the fourth RACH message 450 indicating successful processing of the third RACH message 440 by the base station 402. In some examples, the UE 404 may continue retransmitting the third RACH message 440 until a timer (e.g., a RACH procedure timer) expires.

Although the example of FIG. 4 depicts a four-step RACH procedure 410, it may be appreciated that in other examples, a UE and a base station may employ a two-step random access procedure. For example, the UE may initiate a message exchange of a two-step RACH procedure by sending a first two-step RACH message to the base station and, responsive to the first two-step RACH message, the base station may complete the message exchange by sending a second two-step RACH message to the UE. In certain aspects, the first two-step RACH message may be referred to as "MsgA" and the second two-step RACH message may be referred to as "MsgB."

In some examples, a wireless device (e.g., a UE) may be connected to more than one network entity at a time. For example, a UE may communicate with a communication network using a multi-connectivity configuration, such as dual-connectivity. A UE configured for dual-connectivity may be connected to two different base stations.

Figure 5:
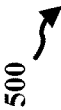
FIG. 5 is a diagram illustrating non-standalone (NSA) mode signaling including a master base station, a secondary base station, and a UE, in accordance with various aspects of the present disclosure.

FIG. 5 is a diagram illustrating a multi-connectivity environment 500 including a master base station 502, a secondary base station 506, and a UE 504, as presented herein. Aspects of the base stations 502, 506 may be implemented by the base station 102/180 of FIG. 1, the base station 310 of FIG. 3, and/or the base station 402 of FIG. 4. Aspects of the UE 504 may be implemented by the UE 104 of FIG. 1, the UE 350 of FIG. 3, and/or the UE 404 of FIG. 4. Although not shown in the illustrated example of FIG. 5, it may be appreciated that in additional or alternative examples, one or both of the base station 502, 506 may be in communication with one or more other base stations or UEs, and/or the UE 504 may be in communication with one or more other base stations or UEs.

Each of the base stations 502, 506 may include a cell. In some examples, each cell group may include one or more serving cells (sometimes referred to as "carriers"). A master cell group (MCG) is a cell group that includes at least a primary serving cell and may also include one or more secondary serving cells (e.g., the MCG may include a primary serving cell and zero or more secondary serving cells). A secondary cell group (SCG) is a cell group that includes or more additional serving cells. In the illustrated example of FIG. 5, the MCG may refer to a group of cells that serve the master base station 502 (sometimes referred to as a "master node," an "anchor node," or a "primary node"). The SCG may refer to a group of cells that serve the secondary base station 506 (sometimes referred to as a "secondary node").

In a multi-connectivity environment, such as a dual-connectivity environment, while the transfer of data may be split between the MCG and the SCG, control of multi-connectivity remains with the MCG. For example, RRC configurations related to the SCG may be sent to the UE by the master base station 502. Other non-scheduling related control information related to the SCG can also be routed through the master base station 502, while scheduling for the SCG can be handled by the secondary base station 506.

In some examples, for each cell group, the one or more carriers for each cell group may operate with respective transmit powers. For example, the UE 504 may transmit an uplink transmission to the master base station 502 using an MCG transmit power and the UE 504 may transmit an uplink transmission to the secondary base station 506 using an SCG transmit power. It may be appreciated that in some multi-connectivity scenarios, the simultaneous communication by the UE 504 with the master base station 502 and the secondary base station 506 can result in increased power consumption by the UE 504.

In some examples, the different cell groups may facilitate communication using different radio access technologies (RATs). For example, the MCG may facilitate communication with the UE via a first RAT and the SCG may facilitate communication with the UE via a second RAT. In the illustrated example of FIG. 5, the master base station 502 and the UE 504 may establish a master access link 510 (sometimes referred to as a "primary leg"). The secondary base station 506 and the UE 504 may establish a secondary access link 512 (sometimes referred to as a "secondary leg"). The UE 504 may employ the four-step RACH procedure 410 of FIG. 4 to establish the connection with the master base station 502 and/or the secondary base station 506. In the illustrated example of FIG. 5, the master base station 502 is in communication with the secondary base station 506 via an interface 514.

The example multi-connectivity environment 500 also includes a core network (CN) 508. In the illustrated example, the CN 508 is coupled to the master base station 502. Accordingly, the master base station 502 may provide a connection to the CN 508. Additionally, the secondary base station 506 may provide a connection to the CN 508 through the interface 514. Accordingly, the UE 504 may communicate with the CN 508 through the master base station 502 and/or the secondary base station 506. For example, the UE 504 may operate in a dual-connectivity operation to communicate with the CN 508 through both the master base station 502 and the secondary base station 506.

In some examples, the secondary base station 506 supporting the SCG may not have a control plane connection to the CN 508 and, instead, may rely on the master base station 502. Such a scenario may be referred to as "non-standalone" (NSA) mode. In the NSA mode, the UE 504 may transmit high priority information and control-plane signaling (e.g., key control-plane information) via the master access link 510 between the UE 504 and the master base station 502. The UE 504 may transmit low priority information and data in the user-plane via the secondary access link 512 between the UE 504 and the secondary base station 506.

In an example aspect of NSA mode, the master base station 502 may facilitate communication via LTE while the secondary base station 506 may facilitate communication via 5G NR. The master access link 510 (e.g., the "LTE leg") may enable reliable transmission of high priority information and control-plane signaling, while the secondary access link 512 (e.g., the "NR leg") may enable high throughput of data in the user-plane.

In the illustrated example, the UE 504 can communicate with an LTE network (e.g., the MCG associated with the master base station 502) and simultaneously communicate with a 5G NR network (e.g., the SCG associated with the secondary base station 506). Since, typically, the 5G NR network has a greater throughput capacity than the LTE network, data communications between the UE 504 and the 5G NR network (e.g., between the UE 504 and the secondary base station 506) may include data associated with high throughput, real time applications such as video streaming or virtual/augmented reality, etc. Otherwise, low throughput applications can, for example, be routed through the LTE network (e.g., between the UE 504 and the master base station 502).

In one implementation (e.g., in an NSA mode), the master base station 502 provides control plane connection to the core network 508. In one example scenario of NSA mode, the UE 504 can send and receive control data and user data with a first access network (e.g., the LTE network facilitated by the master base station 502), but sends and receives user data (along with scheduling for the 5G NR network) with a second access network (e.g., the 5G NR network facilitated by the secondary base station 506).

In some examples, to achieve high data throughput associated with the second access network (e.g., the 5G NR network), it may be beneficial to provide additional power headroom for uplink transmissions though the second access network. Example techniques disclosed herein facilitate power control sharing for uplink transmissions for a UE that is connected to at least two cell groups (e.g., an MCG and an SCG) and is operating in a non-standalone mode. For example, aspects disclosed herein attempt to reduce the transit power associated with the master access link (e.g., the LTE leg) to grant (or provide) the secondary access link (e.g., the 5G NR leg) more power headroom. By granting the secondary access link more power headroom, more data may be carried on the NR leg, which may then facilitate achieving higher uplink throughput.

Figure 6:
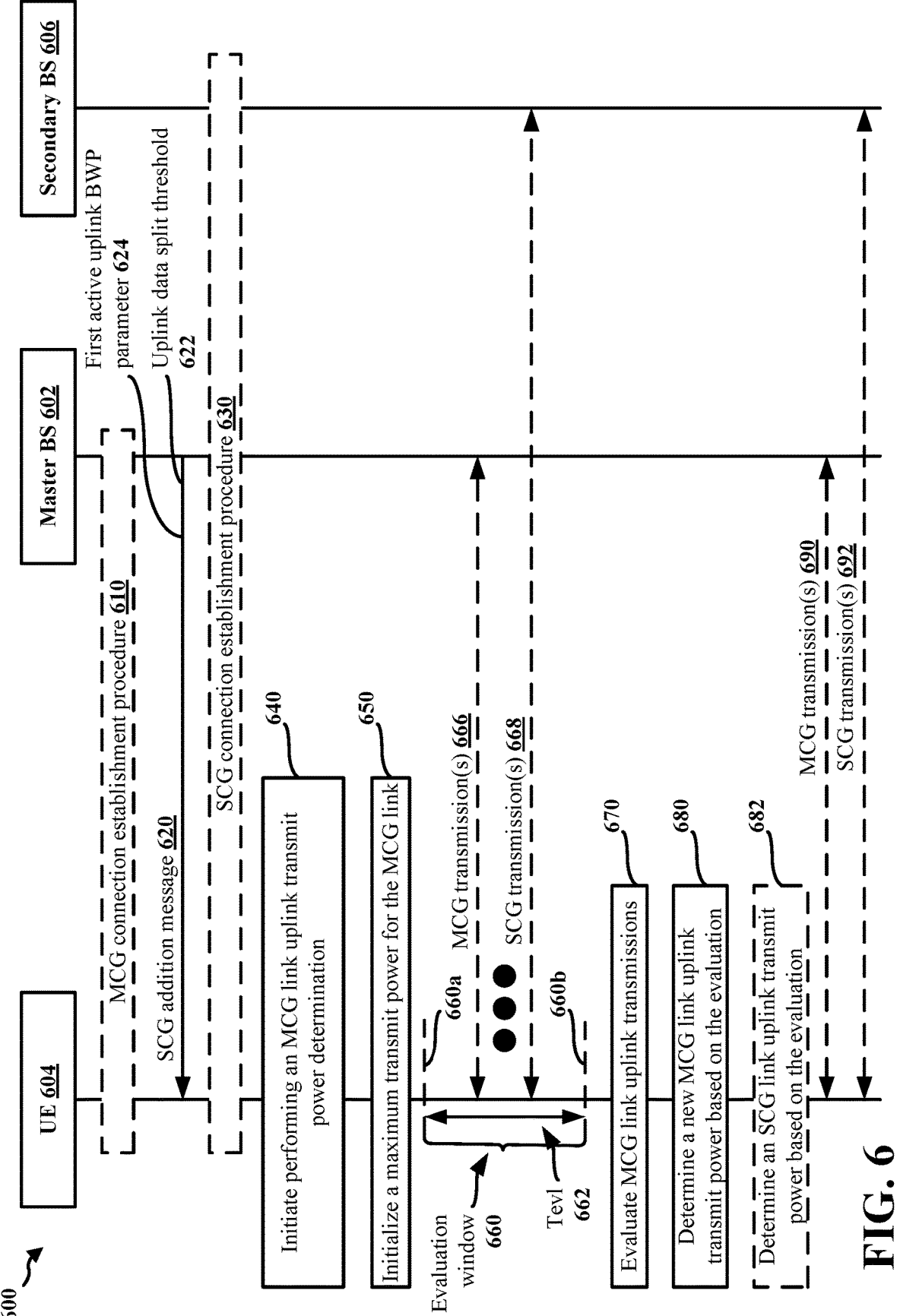
FIG. 6 is an example communication flow between a master base station, a secondary base station, and a UE when the UE employs techniques for determining a master link uplink transmit power, in accordance with the teachings disclosed herein.

FIG. 6 illustrates an example communication flow 600 between a UE 604, a master base station 602, and a secondary base station 606, as presented herein. In the illustrated example, the communication flow 600 facilitates the UE 604 determining a master link uplink transmit power. Aspects of the base stations 602, 604 may be implemented by the base station 102/180 of FIG. 1, the base station 310 of FIG. 3, the base station 402 of FIG. 4, and/or the base stations 502, 506 of FIG. 5. Aspects of the UE 604 may be implemented by the UE 104 of FIG. 1, the UE 350 of FIG. 3, the UE 404 of FIG. 4, and/or the UE 504 of FIG. 5. Although not shown in the illustrated example of FIG. 6, it may be appreciated that in additional or alternative examples, one or both of the base stations 602, 606 may be in communication with one or more other base stations or UEs, and/or the UE 604 may be in communication with one or more other base stations or UEs.

In the example of FIG. 6, the master base station 602 facilitates communication via a first access network (e.g., an LTE network) and the secondary base station 606 facilitates communication via a second access network (e.g., a 5G NR network). Additionally, the communication network of FIG. 6 implements an NSA mode. As described in connection with the example of FIG. 5, the master base station 602 provides control plane connection to the core network (e.g., the CN 508), while the secondary base station 606 provides no control plane connection to the core network and is used to provide additional resources/capabilities to the UE 604. That is, for example, the UE 604 can send and receive control data and user data with the first access network (e.g., the LTE network facilitated by the master base station 602), but sends and receives user data (along with scheduling for the 5G NR network) with the second access network (e.g., the 5G NR network facilitated by the secondary base station 606).

Although the example of FIG. 6 describes the master base station 602 facilitating an LTE network and the secondary base station 606 facilitating a 5G NR network, it may be appreciated that in other examples, the master base station 602 and the secondary base station 606 may both provide access to a same radio access network (e.g., the 5G NR network). Additionally, while the master base station 602 and the secondary base station 606 each use a different radio access technology for communication with the UE 604, it may be appreciated that additional or alternative examples may employ combinations other than an LTE network and a 5G NR network.

As shown in FIG. 6, the UE 604 and the master base station 602 perform an MCG connection establishment procedure 610. Aspects of the MCG connection establishment procedure 610 may be implemented by the four-step RACH procedure 410 of FIG. 4.

After establishing the MCG connection, the UE 604 and the master base station 602 may exchange messages, including downlink (DL) and/or uplink (UL) data. Such data can include control data or configuration data. In one example, the master base station 602 may transmit an RRC configuration to the UE 604. In some examples, RRC configurations include information or instructions for the UE 604 to perform measurements on various signals in the environment of the UE 604. For example, an RRC configuration may include information or instructions for the UE 604 to perform measurements on reference signals being transmitted by cells associated with the MCG and on reference signals being transmitted by cells associated with the SCG.

In the example NSA mode scenario of FIG. 6, initial network access is to the first access network (e.g., the LTE network). Further, the LTE network may control if and when the UE 604 will connect to the second access network (e.g., the 5G NR network). As such, reference signal measurements from cells in the 5G NR network can be used by the LTE network to determine when 5G NR signals, as measured by the UE 604, are strong enough in order for the master base station 602 to initiate an addition of an SCG and for the UE 604 to enter a multi-connectivity mode in which the UE 604 is able to transmit data to the master base station 602 and to the secondary base station 606.

In the illustrated example, the master base station 602 transmits an SCG addition message 620 that is received by the UE 604. The master base station 602 may transmit the SCG addition message 620 using RRC signaling. For example, the SCG addition message 620 may correspond to a "NR5G RRC OTA msg RADIO_BEARER_CONFIG" that is received by the UE 604.

As shown in FIG. 6, the SCG addition message 620 may include an uplink data split threshold 622 ("ul-DataSplit-Threshold"). The uplink data split threshold 622 is a threshold set by the network (e.g., the master base station 602) for uplink data. When the uplink data split threshold 622 is met, the UE 604 may split the data in an uplink transmission. Until the uplink data split threshold 622 is met, the UE 604 may transmit uplink transmissions to the master base station 602. The master base station 602 may configure different values for the uplink data split threshold 622 ranging from zero to infinity. When the master base station 602 sets the uplink data split threshold 622 to infinity, the master base station 602 indicates that the UE 604 is to transmit all uplink data to the master base station 602.

The example SCG addition message 620 may also include a first active uplink bandwidth part (BWP) parameter 624 ("firstActiveUplinkBWP"). The first active uplink BWP parameter 624 indicates the uplink BWP that the UE 604 is to use upon activation with the secondary base station 606. In some examples, the first active uplink BWP parameter 624 may be equal to or less than the total uplink bandwidth, which may be configured for the UE 604.

In the illustrated example, the UE 604 and the secondary base station 606 may perform an SCG connection establishment procedure 630. Aspects of the SCG connection establishment procedure 630 may be implemented by the four-step RACH procedure 410 of FIG. 4.

Although not shown in the example of FIG. 6, it may be appreciated that the master base station 602 and the secondary base station 606 may exchange one or more messages to establish a connection (e.g., via the interface 514 of FIG. 5). Such a connection may enable the base stations 602, 606 to communicate and to prepare the secondary base station 606 to establish the SCG connection with the UE 604.

At 640, the UE 604 initiates performing an MCG link uplink transmit power determination. For example, the UE 604 may determine whether to decrease the MCG link uplink transmit power, to increase the MCG link uplink transmit power, or to set the MCG link uplink transmit power to a maximum transmit power limit (MTPL) associated with the UE 604. The MTPL associated with the UE 604 may be based on, for example, RF capabilities of the UE 604 and may correspond to the maximum transmit power that is shared for transmissions split between the master base station 602 and the secondary base station 606 (e.g., a "split uplink bearer" scenario).

The UE 604 may determine to decrease the MCG link uplink transmit power when the uplink performance, while using a current MCG link uplink transmit power, is suitable or acceptable (e.g., satisfies quality-of-service (QoS) thresholds). Decreasing the MCG link uplink transmit power may then enable the UE 604 to increase an SCG link uplink transmit power. In some examples, the UE 604 may determine to increase the MCG link uplink transmit power when the uplink performance, while using the current MCG link uplink transmit power, is not suitable or not acceptable (e.g., does not satisfy QoS thresholds). In some examples, the UE 604 may increase the MCG link uplink transmit power based on an adjustment value (e.g., a margin). In some examples, the UE 604 may increase the MCG link uplink transmit power to the MTPL associated with the UE 604.

In some examples, the UE 604 initiates performing the MCG link uplink transmit power determination (e.g., at 640) based on the SCG addition message 620. For example, the UE 604 may initiate performing the MCG link uplink transmit power determination when the SCG addition message 620 includes the first active uplink BWP parameter 624 and includes the uplink data split threshold 622. In some examples, the UE 604 may initiate performing the MCG link uplink transmit power determination when the uplink data split threshold 622 is not equal to infinity. That is, the UE 604 abstains (or foregoes) performing the MCG link uplink transmit power determination when the uplink data split threshold 622 is set to infinity, as a value of infinity indicates that the UE 604 is to transmit the entire uplink data using the master base station 602.

At 650, the UE 604 initializes a maximum transmit power for the MCG link (e.g., the LTE network). For example, the UE 604 may set a maximum transmit power for uplink transmissions to the master base station 602. In some examples, the UE 604 may initialize the maximum transmit power for the MCG link ("MTPL_LTE") based on the MTPL associated with the UE 604. In some examples, the UE 604 may initialize the MTPL_LTE based on a portion (or fraction) of the MTPL. The UE 604 may initialize the MTPL_LTE based on a transmit power threshold. The transmit power threshold may be set to a default value (e.g., 20 decibels (dB)). In some examples, the master base station 602 may configure the transmit power threshold (e.g., via RRC signaling, DCI, and/or a MAC control element (MAC-CE)).

In some examples, to initialize the MTPL_LTE, the UE 604 may compare the transmit power for a message associated with a random access procedure to the transmit power threshold. The UE 604 may compare the transmit power for the third RACH message 440 of the four-step RACH procedure. If the transmit power for the third RACH message 440 is greater than the transmit power threshold, the UE 604 may set the MTPL_LTE to the MTPL associated with the UE 604. If the transmit power for the third RACH message 440 is less than or equal to the transmit power threshold, the UE 604 may apply Equation 1 (below) to initialize the MTPL_LTE.

$$\text{MTPL\_LTE} = \qquad\qquad\qquad\qquad\qquad\qquad \text{Equation 1}$$
$$MTPL * \frac{\text{UL\_BW\_LTE}}{\text{UL\_BW\_LTE} + \text{NR\_firstActiveUplinkBWP}}$$

In Equation 1, the variable "MTPL_LTE" refers to the maximum transmit power for the MCG link. The variable "MTPL" refers to the maximum transmit power associated with the UE 604. The variable "UL_BW_LTE" refers to the total uplink bandwidth of the LTE leg (e.g., the MCG link).

The variable "NR_firstActiveUplinkBWP" refers to the first active uplink bandwidth part of the 5G NR leg (e.g., the SCG link). Based on Equation 1, it may be appreciated that the UE 604 may set the maximum transmit power for the MCG link (MTPL_LTE) as a proportion of the MTPL associated with the UE 604 based on a ratio of the total uplink bandwidth of the LTE leg to the total uplink bandwidth of the LTE leg and the 5G NR leg.

Although the example of FIG. 6 describes using the transmit power for the third RACH message to initialize the MTPL_LTE, it may be appreciated that in other examples, the UE 604 may use the transmit power for another message to initialize the MTPL_LTE. For example, if the UE 604 and the base station 602 employ a two-step random access procedure, the UE 604 may use the transmit power for a first two-step RACH message (e.g., the MsgA) to initialize the MTPL_LTE.

As shown in FIG. 6, after initializing the maximum transmit power for the MCG link (e.g., at 650), the UE 604 may exchange messages with the master base station 602 and/or the secondary base station 606. For example, the UE 604 may transmit MCG transmission(s) 666 to and/or receive MCG transmission(s) 666 from the master base station 602. The UE 604 may transmit MCG transmission(s) 666 to the master base station 602 based on the maximum transmit power for the MCG link (e.g., based on the MTPL_LTE). In some examples, the UE 604 may receive feedback from the master base station 602 based on an MCG transmission 666 transmit by the UE 604. The feedback may include an acknowledgement (ACK) message or a negative acknowledgment (NACK) message. In a similar manner, the UE 604 may transmit SCG transmission(s) 668 to and/or receive SCG transmission(s) 668 from the secondary base station 606.

In the illustrated example of FIG. 6, the UE 604 may exchange the MCG transmission(s) 666 with the master base station 602 and/or the SCG transmission(s) 668 with the secondary base station 606 during an evaluation window 660. As shown in FIG. 6, the evaluation window 660 starts at a first time 660a and ends at a second time 660b. In some examples, the UE 604 may start a timer at the first time 660a and the timer may expire at the second time 660b. The time duration associated with the evaluation window 660 may be referred to as Tevl 662. The Tevl 662 may be set to a default value (e.g., 10 system frames). In some examples, the master base station 602 may configure the Tevl 662 (e.g., via RRC signaling, DCI, and/or a MAC-CE).

After the evaluation window 660 expires (e.g., after the timer expires at the second time 660b), the UE 604 evaluates MCG link uplink transmissions. In some examples, the UE 604 calculates an uplink block error rate ("LTE_UL_BLER") associated with the MCG transmission(s) 666 that the UE 604 transmit to the master base station 602 during the evaluation window 660. In some examples, the UE 604 may apply Equation 2 (below) to calculate the uplink block error rate (BLER) associated with the MCG link.

$$\text{LTE\_UL\_BLER} = \frac{PHICH\ NACK}{PHICH\ NACK + ACK} \qquad \text{Equation 2}$$

In Equation 2, the variable "LTE_UL_BLER" refers to the uplink block error rate calculated for the LTE link (e.g., the MCG link). The variable "PHICH NACK" refers to the count of NACK messages received from the master base station 602 via a physical hybrid-ARQ indicator channel (PHICH). The variable "PHICH NACK+ACK" refers to the total count of NACK messages and ACK messages received from the master base station 602 via the PHICH.

In some examples, the UE 604 may calculate an average signal level ("avg_Sig_Levl") associated with the MCG transmission(s) 666 that the UE 604 transmit to the master base station 602 during the evaluation window 660. In an aspect, the average signal level may correspond to an average signal-to-noise ratio (SNR) associated with the MCG transmission(s) 666.

At 680, the UE 604 determines a new MCG link uplink transmit power based on the evaluation. For example, the UE 604 may determine to decrease the current MCG link uplink transmit power (e.g., the MTPL_LTE initialized at 650) or may increase the current MCG link uplink transmit power.

The UE 604 may determine the new MCG link uplink transmit power based on the uplink block error rate (LTE_UL_BLER) and/or the average signal level (Avg_Sig_Levl). For example, if the uplink block error rate (LTE_UL_BLER) and/or the average signal level indicate that there is decreased performance associated with the LTE leg (e.g., the MCG link), the UE 604 may determine to increase the MCG link uplink transmit power. For example, if the uplink block error rate (LTE_UL_BLER) is greater than a first BLER threshold (e.g., 10%) or the average signal level (Avg_Sig_Levl) is less than a signal level threshold (e.g., 10), then the UE 604 may determine that there is decreased performance associated with the LTE leg. In such examples, the UE 604 may set the new MCG link uplink transmit power to the MTPL associated with the UE 604.

In some examples, the UE 604 may determine to marginally adjust the current MCG link uplink transmit power. For example, the UE 604 may increase the current MCG link uplink transmit power by a first adjustment value ("margin1") or may decrease the current MCG link uplink transmit power by a second adjustment value ("margin2"). The first adjustment value may be less than or equal to the second adjustment value (e.g., margin2<=margin1). In some examples, if the UE 604 determines that the uplink block error rate (LTE_UL_BLER) is less than or equal to the first BLER threshold (e.g., 10%) and greater than a second BLER threshold (e.g., 5%), then the UE 604 may determine that the MCG link uplink transmit power may be modestly raised for better uplink transmission performance. For example, the UE 604 may increase the current MCG link uplink transmit power by the first adjustment value (e.g., 3 dB).

In some examples, if the UE 604 determines that the uplink block error rate (LTE_UL_BLER) is less than or equal to the second BLER threshold (e.g., 5%), then the UE 604 may determine that the current MCG link uplink transmit power is able to provide an acceptable or suitable uplink transmission performance and that the MCG link uplink transmit power may be modestly decreased. For example, the UE 604 may decrease the current MCG link uplink transmit power by the second adjustment value (e.g., 2 dB). By decreasing the MCG link uplink transmit power, the UE 604 may increase the SCG link uplink transmit power, thereby facilitating achieving higher uplink throughput.

In some examples, one or more of the first BLER threshold, the second BLER threshold, the signal level threshold, the first adjustment value, and/or the second adjustment value may be set to a default value. For example, the first BLER threshold may be set to 10%, the second BLER threshold may be set to 5%, the signal level threshold may be set to 10, the first adjustment value may be set to 3 dB, and/or the second adjustment value may be set to 2 dB. In some examples, the master base station 602 may configure one or more of the first BLER threshold, the second BLER threshold, the signal level threshold, the first adjustment value, and/or the second adjustment value (e.g., via RRC signaling, DCI, and/or a MAC-CE).

At 682, the UE 604 may determine an SCG link uplink transmit power based on the evaluation. For example, the UE 604 may set the SCG link uplink transmit power based on the MTPL associated with the UE 604 and the new MCG link uplink transmit power.

The UE 604 may exchange messages with the master base station 602 and/or the secondary base station 606 based on the new MCG link uplink transmit power (e.g., determined at 680) and the SCG link uplink transmit power (e.g., determined at 682). For example, the UE 604 may transmit MCG transmission(s) 690 to and/or receive MCG transmission(s) 690 from the master base station 602. The UE 604 may transmit MCG transmission(s) 690 to the master base station 602 based on the new MCG link uplink transmit power (e.g., based on the new MTPL LTE). In a similar manner, the UE 604 may transmit SCG transmission(s) 692 to and/or receive SCG transmission(s) 692 from the secondary base station 606. The UE 604 may transmit SCG transmission(s) 692 to the secondary base station 606 based on the SCG link uplink transmit power (e.g., determined at 682).

Although not shown in FIG. 6, it may be appreciated that in some examples, the UE 604 may re-evaluate the MCG link uplink transmissions. For example, the UE 604 may be configured re-evaluate the MCG link uplink transmissions periodically, a-periodically, or as a one-time event.

FIG. 7 depicts a listing 700 of pseudocode for adjusting transmit power headroom for a secondary link while operating in a non-standalone mode, as presented herein. The example listing 700 includes a first portion 710 that provides definitions of variables used in the pseudocode.

The example listing 700 includes a second portion 720 that describes initiating performing an MCG link uplink transmit power determination. For example, aspects of the second portion 720 may correspond to 640 of FIG. 6.

The example listing 700 includes a third portion 730 that describes initializing the maximum transmit power associated with the LTE leg (e.g., the MCG link). For example, aspects of the third portion 730 may correspond to 650 of FIG. 6.

The example listing 700 includes a fourth portion 740 that describes adjusting the transmit power for the LTE link. In the illustrated example, the fourth portion 740 includes a first sub-portion 742 that describes initiating a timer. Aspects of the timer may correspond to the evaluation window 660 of FIG. 6. The fourth portion 740 includes a second sub-portion 744 that describes calculating an uplink block error rate (LTE_UL_BLER) and an average signal level (Avg_Sig_Levl). Aspects of the second sub-portion 744 may correspond to 670 of FIG. 6. The fourth portion 740 also includes a third sub-portion 746 that describes determining a new MCG link uplink transmit power (MTPL_LTE). Aspects of the third sub-portion 746 may correspond to 680 of FIG. 6.

Figure 8:
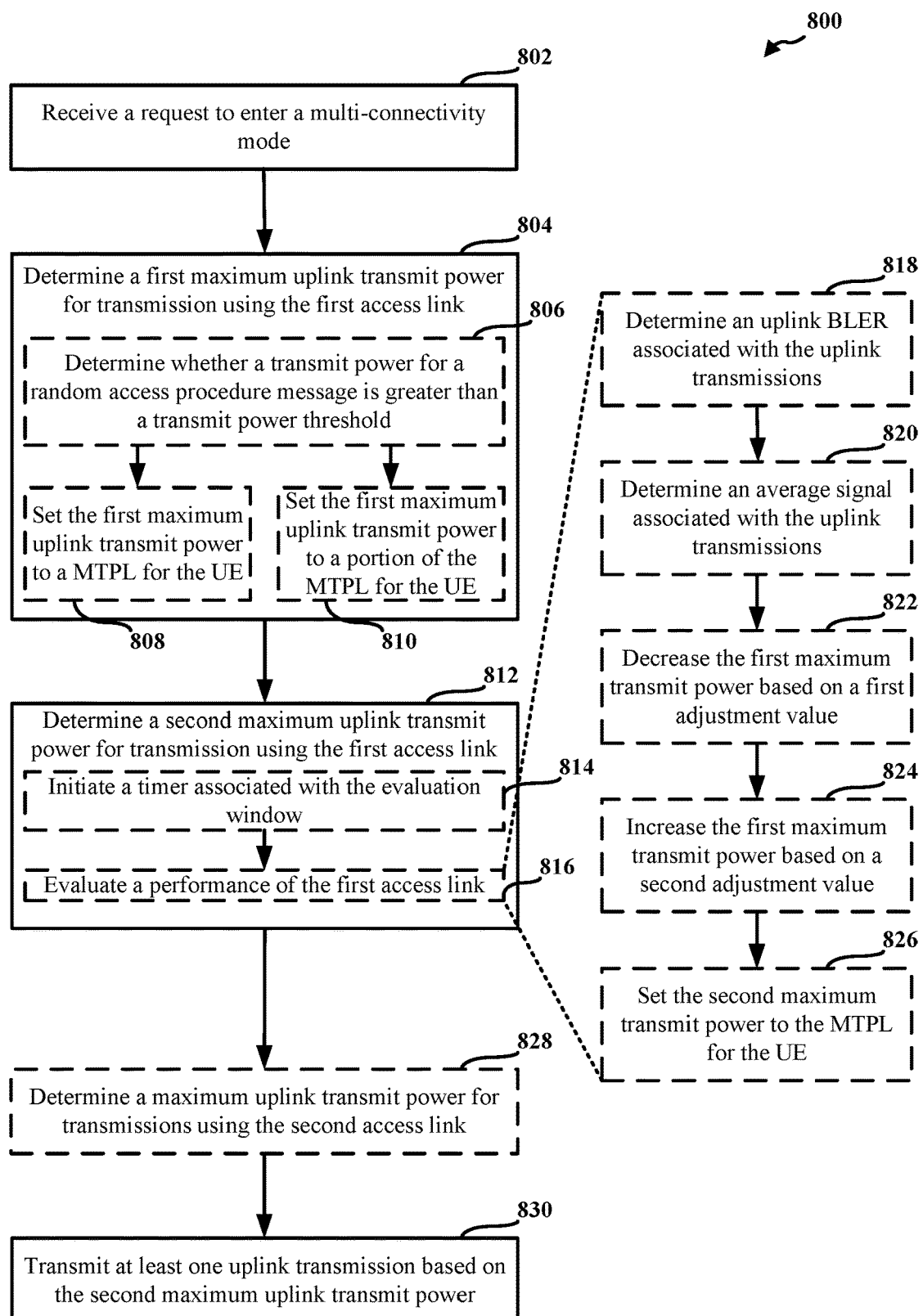
FIG. 8 is a flowchart of a method of wireless communication at a UE, in accordance with the teachings disclosed herein.

FIG. 8 is a flowchart 800 of a method of wireless communication. The method may be performed by a UE (e.g., the UE 104, the UE 350, and/or an apparatus 902 of FIG. 9). Optional aspects are illustrated with a dashed line. The method may facilitate improving uplink throughput by enabling the UE to adjust power headroom.

At 802, the UE receives a request to enter a multi-connectivity mode, as described in connection with the SCG addition message 620 of FIG. 6. For example, 802 may be performed by a multi-connectivity component 940 of the apparatus 902 of FIG. 9. When operating in the multi-connectivity mode, the UE is able to transmit data to a first base station via a first access link (e.g., the master access link 510 of FIG. 5 and/or the LTE leg) or to a second base station via a second access link (e.g., the secondary access link 512 of FIG. 5 and/or the 5G NR leg). The UE may receive the request via RRC signaling.

In some examples, the request to enter the multi-connectivity mode may include a first active uplink bandwidth part (BWP) parameter, as described in connection with the first active uplink BWP parameter 624 (firstActiveUplinkBWP) of FIG. 6. In some examples, the request to enter the multi-connectivity mode may include an uplink data split threshold, as described in connection with the uplink data split threshold 622 (ul-DataSplitThreshold) of FIG. 6. The uplink data split threshold may be set to a value indicating splitting of data using the first access link and the second access link. For example, the uplink data split threshold (ul-DataSplitThreshold) may not be set to a value of infinity.

At 804, the UE determines a first maximum uplink transmit power for transmissions using the first access link, as described in connection with 650 of FIG. 6. For example, 804 may be performed by a first access link MTPL component 942 of the apparatus 902 of FIG. 9. The UE may determine the first maximum uplink transmit power for transmissions using the first access link (MTLP_LTE) based on the request received at 802.

At 812, the UE determines a second maximum uplink transmit power for transmissions using the first access link, as described in connection with 680 of FIG. 6. For example, 812 may be performed by the first access link MTPL component 942 of the apparatus 902 of FIG. 9. The UE may determine the second maximum uplink transmit power based on uplink transmissions transmitted during an evaluation window, as described in connection with the evaluation window 660 of FIG. 6.

At 830, the UE transmits, to the first base station via the first access link, at least on uplink transmission based on the second maximum uplink transmit power, as described in connection with the MCG transmission(s) 690 of FIG. 6. For example, 830 may be performed by a first access link transmission component 944 of the apparatus 902 of FIG. 9.

In some examples, the UE may determine the first maximum uplink transmit power based on a transmit power threshold. For example, at 806, the UE may determine whether a transmit power for a random access procedure message is greater than the transmit power threshold, as described in connection with 650 of FIG. 6 and the third portion 730 of FIG. 7. For example, 806 may be performed by an initialization component 946 of the apparatus 902 of FIG. 9.

At 808, the UE may set the first maximum uplink transmit power to the MTPL for the UE when the transmit power for the random access procedure message is greater than the transmit power threshold, as described in connection with 650 of FIG. 6 and the third portion 730 of FIG. 7. For example, 808 may be performed by the initialization component 946 of the apparatus 902 of FIG. 9.

At 810, the UE may set the first maximum uplink transmit power to a portion of the MTPL for the UE when the transmit power for the random access procedure message is less than or equal to the transmit power threshold, as described in connection with 650 of FIG. 6 and the third portion 730 of FIG. 7. For example, 810 may be performed by the initialization component 946 of the apparatus 902 of FIG. 9.

In some examples, setting the first maximum uplink transmit power to the portion of the MTPL for the UE may be based on a ratio of an uplink bandwidth associated with the first access link ("uplink bandwidth associated with the first access link") to a total uplink bandwidth associated with the first access link and the second access link ("total uplink bandwidth associated with first access link+second access link"). For example, setting the first maximum uplink transmit power to the portion of the MTPL for the UE may be based on Equation 1 (above).

In some examples, the UE may determine the second maximum uplink transmit power for transmissions based on the evaluation window. For example, at 814, the UE initiate a timer associated with the evaluation window, as described in connection with the first time 660a and/or the duration Tevl of FIG. 6 and/or the first sub-portion 742 of FIG. 7. For example, 814 may be performed by a timer component 948 of the apparatus 902 of FIG. 9.

At 816, the UE may evaluate a performance of the first access link based on uplink transmissions transmitted during the evaluation window when the timer expires, as described in connection with 670 of FIG. 6. For example, 816 may be performed by an evaluation component 950 of the apparatus 902 of FIG. 9.

At 818, the UE may determine an uplink BLER (LTE_UL_BLER) associated with the uplink transmissions transmitted during the evaluation window, as described in connection with 670 of FIG. 6 and/or the second sub-portion 744 of FIG. 7. For example, 818 may be performed by the evaluation component 950 of the apparatus 902 of FIG. 9. In some examples, the UE may apply Equation 2 (above) to determine the uplink BLER associated with the uplink transmissions.

At 820, the UE may determine an average signal level (Avg_Sig_Levl) associated with the uplink transmissions transmitted during the evaluation window, as described in connection with 670 of FIG. 6 and/or the second sub-portion 744 of FIG. 7. For example, 820 may be performed by the evaluation component 950 of the apparatus 902 of FIG. 9. In some examples, the average signal level (Avg_Sig_Levl) is based on an average SNR.

At 822, the UE may decrease the first maximum transmit power based on a first adjustment value to determine the second maximum uplink transmit power when the uplink BLER is less than or equal to a first threshold, as described in connection with 680 of FIG. 6 and/or the third sub-portion 746 of FIG. 7. For example, 822 may be performed by the first access link MTPL component 942 of the apparatus 902 of FIG. 9. For example, the UE may decrease the first maximum transmit power by 2 dB when the uplink BLER is less than or equal to 5%.

At 824, the UE may increase the first maximum transmit power based on a second adjustment value to determine the second maximum uplink transmit power when the uplink BLER is greater than the first threshold and less than a second threshold, as described in connection with 680 of FIG. 6 and/or the third sub-portion 746 of FIG. 7. For example, 824 may be performed by the first access link MTPL component 942 of the apparatus 902 of FIG. 9. For example, the UE may increase the first maximum transmit power by 3 dB when the uplink BLER is greater than 5% and less than or equal to 10%.

At 826, the UE may set the second maximum uplink transmit power to a MTPL for the UE when at least one of the uplink BLER is greater than the second threshold and the average signal level is greater than a signal threshold, as described in connection with 680 of FIG. 6 and/or the third sub-portion 746 of FIG. 7. For example, 826 may be performed by the first access link MTPL component 942 of the apparatus 902 of FIG. 9. For example, the UE may set the second maximum uplink transmit power to the MTPL for the UE when the uplink BLER (LTE_UL_BLER) is greater than 10% or the average signal level (Avg_Sig_Levl) is greater than 10.

At 828, the UE may determine a maximum uplink transmit power for transmissions using the second access link, as described in connection with 682 of FIG. 6. For example, 828 may be performed by a second access link MTPL component 952 of the apparatus 902 of FIG. 9. The UE may determine the maximum uplink transmit power for transmissions using the second access link based on the MPTL for the UE and the second maximum uplink transmit power for transmissions using the first access link.

Figure 9:
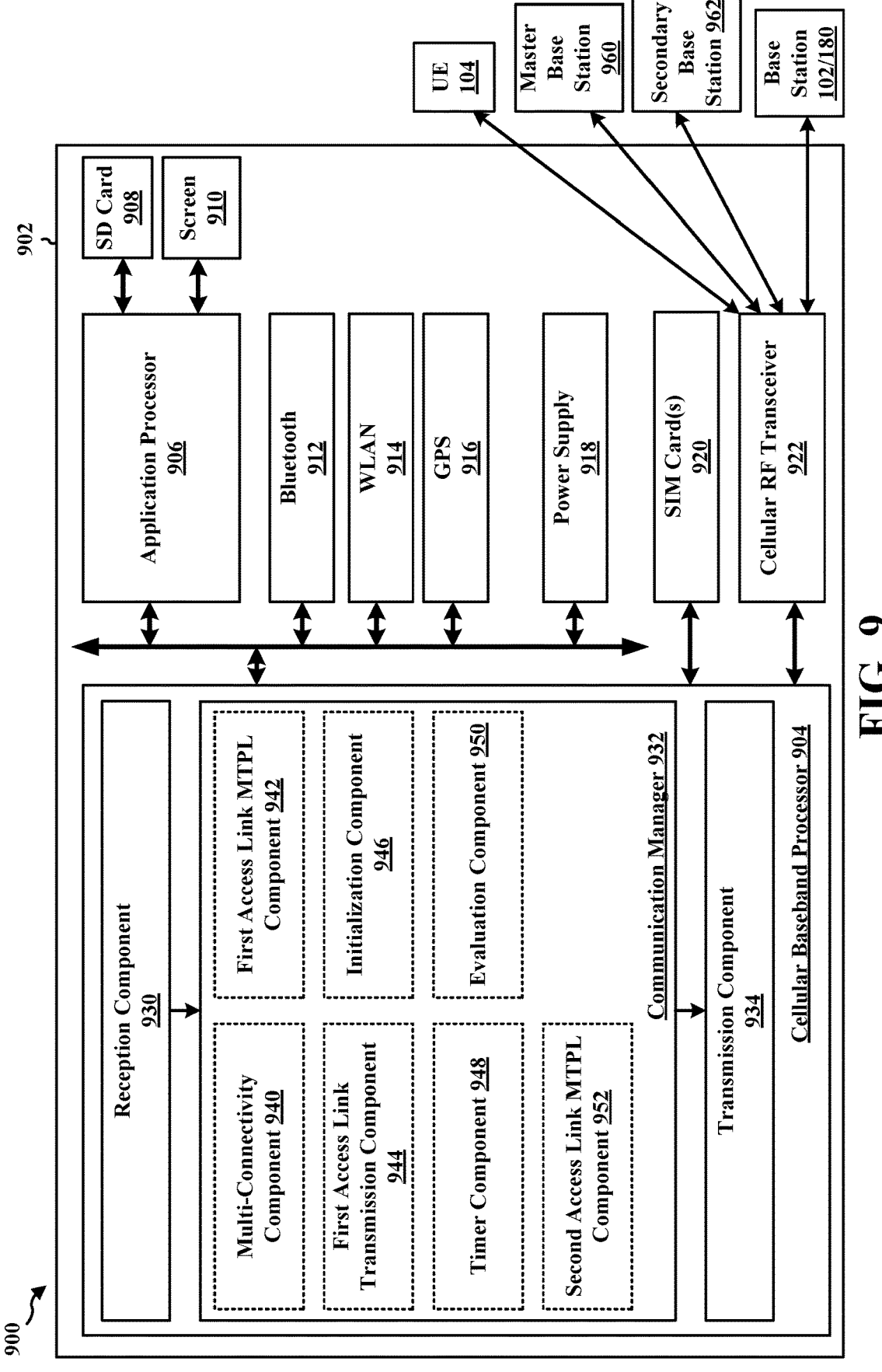
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104, the base station 102/180, a master base station 960, and/or a secondary base station 962. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see the UE 350 of FIG. 3) and include the additional modules of the apparatus 902.

The communication manager 932 includes a multi-connectivity component 940 that is configured to receive a request to enter a multi-connectivity mode, for example, as described in connection with 802 of FIG. 8.

The communication manager 932 also includes a first access link MTPL component 942 that is configured to determine a first maximum uplink transmit power for transmissions using the first access link, for example, as described in connection with 804 of FIG. 8. The first access link MTPL component 942 may be further configured to determine a second maximum uplink transmit power for transmissions using the first access link, for example, as described in connection with 812 of FIG. 8. The first access link MTPL component 942 may be further configured to decrease the first maximum transmit power based on a first adjustment value to determine the second maximum uplink transmit power when the uplink BLER is less than or equal to a first threshold, for example, as described in connection with 822 of FIG. 8. The first access link MTPL component 942 may be further configured to increase the first maximum transmit power based on a second adjustment value to determine the second maximum uplink transmit power when the uplink BLER is greater than the first threshold and less than a second threshold, for example, as described in connection with 824 of FIG. 8. The first access link MTPL component 942 may be further configured to set the second maximum uplink transmit power to a MTPL for the UE when at least one of the uplink BLER is greater than the second threshold and the average signal level is greater than a signal threshold, for example, as described in connection with 826 of FIG. 8.

The communication manager 932 also includes a first access link transmission component 944 that is configured to transmits, to the first base station via the first access link, at least on uplink transmission based on the second maximum uplink transmit power, for example, as described in connection with 830 of FIG. 8.

The communication manager 932 also includes an initialization component 946 that is configured to determine whether a transmit power for a random access procedure message is greater than the transmit power threshold, for example, as described in connection with 806 of FIG. 8. The initialization component 946 may be further configured to set the first maximum uplink transmit power to the MTPL for the UE when the transmit power for the random access procedure message is greater than the transmit power threshold, for example, as described in connection with 808 of FIG. 8. The initialization component 946 may be further configured to set the first maximum uplink transmit power to a portion of the MTPL for the UE when the transmit power for the random access procedure message is less than or equal to the transmit power threshold, for example, as described in connection with 810 of FIG. 8.

The communication manager 932 also includes a timer component 948 that is configured to initiate a timer associated with the evaluation window, for example, as described in connection with 814 of FIG. 8.

The communication manager 932 also includes an evaluation component 950 that is configured to evaluate a performance of the first access link based on uplink transmissions transmitted during the evaluation window when the timer expires, for example, as described in connection with 816 of FIG. 8. The evaluation component 950 may be further configured to determine an uplink BLER (LTE_UL_BLER) associated with the uplink transmissions transmitted during the evaluation window, for example, as described in connection with 818 of FIG. 8. The evaluation component 950 may be further configured to determine an average signal level (Avg_Sig_Levl) associated with the uplink transmissions transmitted during the evaluation window, for example, as described in connection with 820 of FIG. 8.

The communication manager 932 also includes a second access link MTPL component 952 that is configured to determine a maximum uplink transmit power for transmissions using the second access link, for example, as described in connection with 828 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a request to enter a multi-connectivity mode in which the UE is able to transmit data to a first base station via a first access link or to a second base station via a second access link. The example apparatus 902 also includes means for determining, based on the request, a first maximum uplink transmit power for transmissions using the first access link. The example apparatus 902 also includes means for determining a second maximum uplink transmit power for transmissions using the first access link based on uplink transmissions transmitted during an evaluation window. The example apparatus 902 also includes means for transmitting, to the first base station via the first access link, at least one uplink transmission based on the second maximum uplink transmit power.

In another configuration, the example apparatus 902 also includes means for receiving the request via radio resource control (RRC) signaling.

In another configuration, the example apparatus 902 also includes means for determining whether a transmit power for a random access procedure message is greater than a transmit power threshold. The example apparatus 902 also includes means for setting the first maximum uplink transmit power to a maximum uplink transmit power limit (MTPL) for the UE when the transmit power for the random access procedure message is greater than the transmit power threshold. The example apparatus 902 also includes means for setting the first maximum uplink transmit power to a portion of the MTPL for the UE when the transmit power for the random access procedure message is less than or equal to the transmit power threshold.

In another configuration, the example apparatus 902 also includes means for initiating a timer associated with the evaluation window. The example apparatus 902 also includes means for evaluating a performance of the first access link based on uplink transmissions transmitted during the evaluation window when the timer expires.

In another configuration, the example apparatus 902 also includes means for determining an uplink block error rate (BLER) associated with the uplink transmissions transmitted during the evaluation window. The example apparatus 902 also includes means for decreasing the first maximum transmit power based on a first adjustment value to determine the second maximum uplink transmit power when the uplink BLER is less than or equal to a first threshold. The example apparatus 902 also includes means for increasing the first maximum transmit power based on a second adjustment value to determine the second maximum uplink transmit power when the uplink BLER is greater than the first threshold and less than a second threshold.

In another configuration, the example apparatus 902 also includes means for determining an average signal level associated with the uplink transmissions transmitted during the evaluation window. The example apparatus 902 also includes means for setting the second maximum uplink transmit power to a maximum uplink transmit power limit (MTPL) for the UE when at least one of the uplink BLER is greater than the second threshold and the average signal level is greater than a signal threshold.

In another configuration, the example apparatus 902 also includes means for determining a maximum uplink transmit power for transmissions using the second access link based on the MTPL and the second maximum uplink transmit power.

The aforementioned means may be one or more of the aforementioned components of the apparatus 902 configured to perform the functions recited by the aforementioned means. As described supra, the apparatus 902 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

FIG. 10 is a flowchart 1000 of a method of wireless communication. The method may be performed by a first base station (e.g., the base station 102/180, the base station 310, and/or an apparatus 1102 of FIG. 11). Optional aspects are illustrated with a dashed line. The method may facilitate improving uplink throughput by enabling a UE to adjust power headroom.

At 1002, the first base station transmits, to a UE, a request for the UE to enter a multi-connectivity mode, as described in connection with the SCG addition message 620 of FIG. 6. For example, 1002 may be performed by a multi-connectivity component 1140 of the apparatus 1102 of FIG. 11. When operating in the multi-connectivity mode, the UE is able to transmit data to the first base station via a first access link (e.g., the master access link 510 of FIG. 5 and/or the LTE leg) or to a second base station via a second access link (e.g., the secondary access link 512 of FIG. 5 and/or the 5G NR leg). The base station may transmit the request via RRC signaling.

In some examples, the request to enter the multi-connectivity mode may include a first active uplink bandwidth part (BWP) parameter, as described in connection with the first active uplink BWP parameter 624 (firstActiveUplinkBWP) of FIG. 6. In some examples, the request to enter the multi-connectivity mode may include an uplink data split threshold, as described in connection with the uplink data split threshold 622 (ul-DataSplitThreshold) of FIG. 6. The uplink data split threshold may be set to a value indicating splitting of data using the first access link and the second access link. For example, the uplink data split threshold (ul-DataSplitThreshold) may not be set to a value of infinity.

At 1004, the first base station receives a first set of uplink transmissions from the UE during an evaluation window, as described in connection with the MCG transmission(s) 666 of FIG. 6. For example, 1004 may be performed by a first set reception component 1142 of the apparatus 1102 of FIG. 11. The first set of uplink transmissions may be associated with a first maximum uplink transmit power associated with the first access link. For example, the first maximum uplink transmit power may be based on a maximum uplink transmit power limit (MTPL) for the UE and a transmit power for a random access procedure message. In some examples, the first maximum uplink transmit power is based on a ratio of an uplink bandwidth associated with the first access link to a total uplink bandwidth associated with the first access link and the second access link.

At 1006, the first base station receives a second set of uplink transmissions from the UE after the evaluation window, as described in connection with the MCG transmission(s) 690 of FIG. 6. For example, 1006 may be performed by a second set reception component 1144 of the apparatus 1102 of FIG. 11. The second set of uplink transmissions may be associated with a second maximum uplink transmit power associated with the first access link.

In some examples, the second maximum uplink transmit power associated with the second set of uplink transmissions may be based on the first maximum uplink transmit power and at least one of an uplink block error rate (BLER) associated with the first set of uplink transmissions or an average signal level associated with the first set of uplink transmissions. In some examples, the average signal level may be based on an average SNR.

Figure 11:
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 is a base station and includes a baseband unit 1104. The baseband unit 1104 may communicate through a cellular RF transceiver 1122 with the UE 104 and/or another base station 1160. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a multi-connectivity component 1140 that is configured to transmit, to a UE, a request for the UE to enter a multi-connectivity mode, for example, as described in connection with 1002 of FIG. 10.

The communication manager 1132 also includes a first set reception component 1142 that is configured to receive a first set of uplink transmissions from the UE during an evaluation window, for example, as described in connection with 1002 of FIG. 10.

The communication manager 1132 also includes a second set reception component 1144 that is configured to receive a second set of uplink transmissions from the UE after the evaluation window, for example, as described in connection with 1002 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a UE, a request for the UE to enter a multi-connectivity mode in which the UE is able to transmit data to the first base station via a first access link or to a second base station via a second access link. The example apparatus 1102 also includes means for receiving a first set of uplink transmissions from the UE during an evaluation window, the first set of uplink transmissions associated with a first maximum uplink transmit power associated with the first access link. The example apparatus 1102 also includes means for receiving a second set of uplink transmissions from the UE, the second set of uplink transmissions associated with a second maximum uplink transmit power associated with the first access link, the second set of uplink transmissions being received after the evaluation window.

In another configuration, the example apparatus 1102 also includes means for transmitting the request via RRC signaling.

The aforementioned means may be one or more of the aforementioned components of the apparatus 1102 configured to perform the functions recited by the aforementioned means. As described supra, the apparatus 1102 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Example techniques disclosed herein enable a UE to adjust a maximum transmit power associated with uplink transmissions using a first access link based on an uplink performance. The UE may be operating in a multi-connectivity mode in which the UE may transmit uplink transmissions to a first base station via the first access link and to a second base station via a second access link. In some examples, the UE may decrease the maximum transmit power associated with uplink transmissions using the first access link based on the uplink performance. In some such examples, the UE may increase a maximum transmit power associated with uplink transmissions using the second access link, which may improve uplink throughput.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving a request to enter a multi-connectivity mode in which the UE is able to transmit data to a first base station via a first access link or to a second base station via a second access link; determining, based on the request, a first maximum uplink transmit power for transmissions using the first access link; determining a second maximum uplink transmit power for transmissions using the first access link based on uplink transmissions transmitted using the first maximum uplink transmit power during an evaluation window; and transmitting, to the first base station via the first access link, at least one uplink transmission based on the second maximum uplink transmit power.

Aspect 2 is the method of aspect 1, further including that the request to enter the multi-connectivity mode includes a first active uplink BWP parameter and an uplink data split threshold, the uplink data split threshold set to a value indicating splitting of data using the first access link and the second access link.

Aspect 3 is the method of any of aspect 1 or aspect 2, further including that the uplink data split threshold is not set to a value of infinity.

Aspect 4 is the method of any of aspects 1 to 3, further including that the UE receives the request via RRC signaling.

Aspect 5 is the method of any of aspects 1 to 4, further including that determining the first maximum uplink transmit power comprises: determining whether a transmit power for a random access procedure message is greater than a transmit power threshold; and setting the first maximum uplink transmit power to a MTPL for the UE when the transmit power for the random access procedure message is greater than the transmit power threshold, or setting the first maximum uplink transmit power to a portion of the MTPL for the UE when the transmit power for the random access procedure message is less than or equal to the transmit power threshold.

Aspect 6 is the method of any of aspects 1 to 5, further including that setting the first maximum uplink transmit power to a portion of the MTPL for the UE is based on a ratio of an uplink bandwidth associated with the first access link to a total uplink bandwidth associated with the first access link and the second access link.

Aspect 7 is the method of any of aspects 1 to 6, further including that setting the first maximum uplink transmit power to a portion of the MTPL for the UE is based on:

$$MTPL * \frac{\text{uplink bandwith associated with first access link}}{\text{total uplink bandwith associated with first access link} + \text{second access link}}.$$

Aspect 8 is the method of any of aspects 1 to 7, further including that determining the second maximum uplink transmit power for transmissions using the first access link further comprises: initiating a timer associated with the evaluation window; and evaluating a performance of the first access link based on uplink transmissions transmitted during the evaluation window when the timer expires.

Aspect 9 is the method of any of aspects 1 to 8, further including that evaluating the performance of the first access link comprises: determining an uplink BLER associated with the uplink transmissions transmitted during the evaluation window; and decreasing the first maximum transmit power based on a first adjustment value to determine the second maximum uplink transmit power when the uplink BLER is less than or equal to a first threshold, or increasing the first maximum transmit power based on a second adjustment value to determine the second maximum uplink transmit power when the uplink BLER is greater than the first threshold and less than a second threshold.

Aspect 10 is the method of any of aspects 1 to 9, further including: determining an average signal level associated with the uplink transmissions transmitted during the evaluation window; and setting the second maximum uplink transmit power to a MTPL for the UE when at least one of the uplink BLER is greater than the second threshold and the average signal level is greater than a signal threshold.

Aspect 11 is the method of any of aspects 1 to 10, further including that the average signal level is based on an average SNR.

Aspect 12 is the method of any of aspects 1 to 11, further including: determining a maximum uplink transmit power for transmissions using the second access link based on the MTPL and the second maximum uplink transmit power.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a non-transitory computer-readable storage medium storing computer executable code, where the code, when executed, causes a processor to implement a method as in any of aspects 1 to 12.

Aspect 16 is a method of wireless communication at a first base station, comprising: transmitting, to a UE, a request for the UE to enter a multi-connectivity mode in which the UE is able to transmit data to the first base station via a first access link or to a second base station via a second access link; receiving a first set of uplink transmissions from the UE during an evaluation window, the first set of uplink transmissions associated with a first maximum uplink transmit power associated with the first access link; and receiving a second set of uplink transmissions from the UE, the second set of uplink transmissions associated with a second maximum uplink transmit power associated with the first access link, the second set of uplink transmissions being received after the evaluation window.

Aspect 17 is the method of aspect 16, further including that the request for the UE to enter the multi-connectivity mode includes a first active uplink BWP parameter and an uplink data split threshold, the uplink data split threshold set to a value indicating splitting of data using the first access link and the second access link.

Aspect 18 is the method of any of aspect 16 or aspect 17, further including that the uplink data split threshold is not set to a value of infinity.

Aspect 19 is the method of any of aspects 16 to 18, further including that the request is transmitted via RRC signaling.

Aspect 20 is the method of any of aspects 16 to 19, further including that the first maximum uplink transmit power associated with the first set of uplink transmissions is based on a MTPL for the UE and a transmit power for a random access procedure message.

Aspect 21 is the method of any of aspects 16 to 20, further including that the first maximum uplink transmit power is based on a ratio of an uplink bandwidth associated with the first access link to a total uplink bandwidth associated with the first access link and the second access link.

Aspect 22 is the method of any of aspects 16 to 21, further including that the second maximum uplink transmit power associated with the second set of uplink transmissions is based on the first maximum uplink transmit power and at least one of an uplink BLER associated with the first set of uplink transmissions or an average signal level associated with the first set of uplink transmissions.

Aspect 23 is the method of any of aspects 16 to 22, further including that the average signal level is based on an average SNR.

Aspect 24 is an apparatus for wireless communication including at least one processor coupled to a memory and configured to implement a method as in any of aspects 16 to 23.

Aspect 25 is an apparatus for wireless communication including means for implementing a method as in any of aspects 16 to 23.

Aspect 26 is a non-transitory computer-readable storage medium storing computer executable code, where the code, when executed, causes a processor to implement a method as in any of aspects 16 to 23.

What is claimed is:
1. A method of wireless communication at a user equipment (UE), comprising:
    receiving a request to enter a multi-connectivity mode in which the UE is configured to transmit data to a first base station via a first access link or to a second base station via a second access link;
    determining, based on the request, a first maximum uplink transmit power for transmissions using the first access link;
    determining a second maximum uplink transmit power for transmissions using the first access link based on uplink transmissions using the first maximum uplink transmit power during an evaluation window based on initiating a timer associated with the evaluation window and evaluating a performance of the first access link based on uplink transmissions during the evaluation window when the timer expires; and

transmitting, to the first base station via the first access link, at least one uplink transmission based on the second maximum uplink transmit power.
2. The method of claim 1, wherein the request to enter the multi-connectivity mode includes a first active uplink bandwidth part (BWP) parameter and an uplink data split threshold, the uplink data split threshold set to a value indicating splitting of data using the first access link and the second access link.
3. The method of claim 2, wherein the uplink data split threshold is not set to a value of infinity.
4. The method of claim 1, wherein the UE receives the request via radio resource control (RRC) signaling.
5. The method of claim 1, wherein determining the first maximum uplink transmit power comprises:
    determining whether a transmit power for a random access procedure message is greater than a transmit power threshold; and
    setting the first maximum uplink transmit power to a maximum uplink transmit power limit (MTPL) for the UE when the transmit power for the random access procedure message is greater than the transmit power threshold, or
    setting the first maximum uplink transmit power to a portion of the MTPL for the UE when the transmit power for the random access procedure message is less than or equal to the transmit power threshold.
6. The method of claim 5, wherein setting the first maximum uplink transmit power to a portion of the MTPL for the UE is based on a ratio of an uplink bandwidth associated with the first access link to a total uplink bandwidth associated with the first access link and the second access link.
7. The method of claim 5, wherein setting the first maximum uplink transmit power to a portion of the MTPL for the UE is based on:

$$MTPL * \frac{\text{first access link uplink bandwidth}}{\text{first access link uplink bandwidth} + \text{second access link uplink bandwidth}}.$$

8. The method of claim 1, wherein evaluating the performance of the first access link comprises:
    determining an uplink block error rate (BLER) associated with the uplink transmissions during the evaluation window; and
    decreasing the first maximum transmit power based on a first adjustment value to determine the second maximum uplink transmit power when the uplink BLER is less than or equal to a first threshold, or
    increasing the first maximum transmit power based on a second adjustment value to determine the second maximum uplink transmit power when the uplink BLER is greater than the first threshold and less than a second threshold.
9. The method of claim 8, further comprising:
    determining an average signal level associated with the uplink transmissions during the evaluation window; and
    setting the second maximum uplink transmit power to a maximum uplink transmit power limit (MTPL) for the UE when at least one of the uplink BLER is greater than the second threshold and the average signal level is greater than a signal threshold.

10. The method of claim 9, wherein the average signal level is based on an average signal-to-noise ratio (SNR).

11. The method of claim 9, further comprising:

determining a maximum uplink transmit power for transmissions using the second access link based on the MTPL and the second maximum uplink transmit power.

12. An apparatus for wireless communication at a user equipment (UE), comprising:

memory; and at least one processor coupled to the memory and configured to:

receive a request to enter a multi-connectivity mode in which the UE is configured to transmit data to a first base station via a first access link or to a second base station via a second access link;

determine, based on the request, a first maximum uplink transmit power for transmissions using the first access link;

determine a second maximum uplink transmit power for transmissions using the first access link based on uplink transmissions using the first maximum uplink transmit power during an evaluation window based on an initiation of a timer associated with the evaluation window and an evaluation of a performance of the first access link based on uplink transmissions during the evaluation window when the timer expires; and transmit, to the first base station via the first access link, at least one uplink transmission based on the second maximum uplink transmit power.

13. The apparatus of claim 12, wherein the request to enter the multi-connectivity mode includes a first active uplink bandwidth part (BWP) parameter and an uplink data split threshold, the uplink data split threshold set to a value indicating splitting of data using the first access link and the second access link.

14. The apparatus of claim 12, wherein to determine the first maximum uplink transmit power, the at least one processor is configured to:

determine whether a transmit power for a random access procedure message is greater than a transmit power threshold; and set the first maximum uplink transmit power to a maximum uplink transmit power limit (MTPL) for the UE when the transmit power for the random access procedure message is greater than the transmit power threshold, or set the first maximum uplink transmit power to a portion of the MTPL for the UE when the transmit power for the random access procedure message is less than or equal to the transmit power threshold.

15. The apparatus of claim 14, wherein the at least one processor is configured to set the first maximum uplink transmit power to a portion of the MTPL for the UE based on a ratio of an uplink bandwidth associated with the first access link to a total uplink bandwidth associated with the first access link and the second access link.

16. The apparatus of claim 12, wherein to evaluate the performance of the first access link, the at least one processor is configured to:

determine an uplink block error rate (BLER) associated with the uplink transmissions during the evaluation window; and decrease the first maximum transmit power based on a first adjustment value to determine the second maximum uplink transmit power when the uplink BLER is less than or equal to a first threshold, or increase the first maximum transmit power based on a second adjustment value to determine the second maximum uplink transmit power when the uplink BLER is greater than the first threshold and less than a second threshold.

17. The apparatus of claim 16, wherein the at least one processor is further configured to:

determine an average signal level associated with the uplink transmissions during the evaluation window; and set the second maximum uplink transmit power to a maximum uplink transmit power limit (MTPL) for the UE when at least one of the uplink BLER is greater than the second threshold and the average signal level is greater than a signal threshold.

18. The apparatus of claim 17, wherein the at least one processor is further configured to:

determine a maximum uplink transmit power for transmissions using the second access link based on the MTPL and the second maximum uplink transmit power.

19. A method of wireless communication at a first base station, comprising:

transmitting, to a user equipment (UE), a request for the UE to enter a multi-connectivity mode in which the UE is configured to transmit data to the first base station via a first access link or to a second base station via a second access link;

receiving a first set of uplink transmissions from the UE during an evaluation window, the first set of uplink transmissions associated with a first maximum uplink transmit power associated with the first access link; and receiving a second set of uplink transmissions from the UE, the second set of uplink transmissions associated with a second maximum uplink transmit power associated with the first access link, the second set of uplink transmissions being after the evaluation window, wherein the second maximum uplink transmit power associated with the second set of uplink transmissions is based on the first maximum uplink transmit power and at least one of an uplink block error rate (BLER) associated with the first set of uplink transmissions or an average signal level associated with the first set of uplink transmissions.

20. The method of claim 19, wherein the request for the UE to enter the multi-connectivity mode includes a first active uplink bandwidth part (BWP) parameter and an uplink data split threshold, the uplink data split threshold set to a value indicating splitting of data using the first access link and the second access link.

21. The method of claim 20, wherein the uplink data split threshold is not set to a value of infinity.

22. The method of claim 19, wherein transmitting the request comprises transmitting the request via radio resource control (RRC) signaling.

23. The method of claim 19, wherein the first maximum uplink transmit power associated with the first set of uplink transmissions is based on a maximum uplink transmit power limit (MTPL) for the UE and a transmit power for a random access procedure message.

24. The method of claim 23, wherein the first maximum uplink transmit power is based on a ratio of an uplink bandwidth associated with the first access link to a total uplink bandwidth associated with the first access link and the second access link.

25. The method of claim 19, wherein the average signal level is based on an average signal-to-noise ratio (SNR).

26. An apparatus for wireless communication at a first base station, comprising:

memory; and at least one processor coupled to the memory and configured to:

transmit, to a user equipment (UE), a request for the UE to enter a multi-connectivity mode in which the UE is configured to transmit data to the first base station via a first access link or to a second base station via a second access link;

receive a first set of uplink transmissions from the UE during an evaluation window, the first set of uplink transmissions associated with a first maximum uplink transmit power associated with the first access link; and receive a second set of uplink transmissions from the UE, the second set of uplink transmissions associated with a second maximum uplink transmit power associated with the first access link, the second set of uplink transmissions being after the evaluation window, wherein the second maximum uplink transmit power associated with the second set of uplink transmissions is based on the first maximum uplink transmit power and at least one of an uplink block error rate (BLER) associated with the first set of uplink transmissions or an average signal level associated with the first set of uplink transmissions.

27. The apparatus of claim 26, wherein to transmit the request, the at least one processor is configured to transmit the request via radio resource control (RRC) signaling.

* * * * *